US012420430B2

(12) United States Patent
Riedel

(10) Patent No.: US 12,420,430 B2
(45) Date of Patent: Sep. 23, 2025

(54) MOBILE SECURITY BASIC CONTROL DEVICE COMPRISING A CODING DEVICE FOR A MOBILE TERMINAL WITH MULTI-TOUCHSCREEN AND METHOD FOR SETTING UP A UNIQUELY ASSIGNED CONTROL LINK

(71) Applicant: KUKA Deutschland GmbH, Augsburg (DE)

(72) Inventor: Martin Riedel, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 217 days.

(21) Appl. No.: 18/071,942

(22) Filed: Nov. 30, 2022

(65) Prior Publication Data

US 2023/0091713 A1 Mar. 23, 2023

Related U.S. Application Data

(63) Continuation of application No. 16/091,584, filed as application No. PCT/EP2017/061545 on May 12, 2017, now Pat. No. 11,597,097.

(51) Int. Cl.
*G06F 3/039* (2013.01)
*B25J 9/16* (2006.01)
(Continued)

(52) U.S. Cl.
CPC ............. *B25J 13/06* (2013.01); *B25J 9/1674* (2013.01); *B25J 19/06* (2013.01); *G05B 19/409* (2013.01);
(Continued)

(58) Field of Classification Search
CPC .......... B25J 13/06; B25J 9/1674; B25J 19/06; G05B 19/409; G05B 2219/34456;
(Continued)

(56) References Cited

U.S. PATENT DOCUMENTS

| 7,663,607 B2 | 2/2010 | Hotelling et al. |
| 2004/0260426 A1 | 12/2004 | Johannessen et al. |

(Continued)

FOREIGN PATENT DOCUMENTS

| CN | 104302452 A | * | 1/2015 | ............. B25J 13/06 |
| CN | 104379307 A | | 2/2015 | |

(Continued)

OTHER PUBLICATIONS

Hollmann Stefan (DE102010025781A1); Kuka Lab Gmbh; Portable safety input apparatus useful for robot controller, comprises inputdevice to enter safety signal to robot controller, and an interface to communicatewith hand-held unit detachably connected with apparatus for controlling robot. (Year: 2012).*

(Continued)

*Primary Examiner* — B M M Hannan
(74) *Attorney, Agent, or Firm* — Bachman & LaPointe, P.C.

(57) ABSTRACT

A mobile security basic control device (15) of a robot (1), has a hand-held housing (16), an emergency stop switching means (17) arranged at the housing (16), a communication device (18) for establishing a link in terms of control between the mobile security basic control device (15) and a robot controller (12) of the robot (1). A holder (19) is connected to the housing (16), which is designed to mount the mobile security basic control device (15) on a mobile terminal (20). The mobile terminal has a terminal control system (21) and a multi-touchscreen (22), which is designed to transmit inputs to the terminal control system (21) via the multi-touchscreen (22). The mobile security basic control device (15) comprises a coding device (25) which, in a state where the mobile security basic control device (15) is mounted on the mobile terminal (20) by means of the holder (19), is designed to automatically transmit at least one (Continued)

identification code identifying the mobile security basic control device (15) to the terminal control system (21) via the multi-touchscreen (22).

15 Claims, 13 Drawing Sheets

(51) Int. Cl.
*B25J 13/06* (2006.01)
*B25J 19/06* (2006.01)
*G05B 19/409* (2006.01)
*G06F 3/04883* (2022.01)

(52) U.S. Cl.
CPC ........ *G06F 3/0393* (2019.05); *G06F 3/04883* (2013.01); *G05B 2219/34456* (2013.01); *G05B 2219/36159* (2013.01); *G05B 2219/36168* (2013.01); *G05B 2219/39001* (2013.01); *G05B 2219/50198* (2013.01); *G06F 2203/04808* (2013.01)

(58) Field of Classification Search
CPC ........... G05B 2219/36159; G05B 2219/36168; G05B 2219/39001; G05B 2219/50198; G06F 3/0393; G06F 3/04883; G06F 2203/04808
USPC ......................................................... 700/264
See application file for complete search history.

(56) References Cited

U.S. PATENT DOCUMENTS

| | | | |
|---|---|---|---|
| 2005/0166413 A1* | 8/2005 | Crampton | G01B 11/03 33/503 |
| 2010/0172733 A1 | 7/2010 | Chalubert et al. | |
| 2012/0268240 A1 | 10/2012 | Frerking | |
| 2015/0066209 A1 | 3/2015 | Som | |
| 2015/0169080 A1 | 6/2015 | Choi et al. | |
| 2016/0114478 A1 | 4/2016 | Wu et al. | |
| 2016/0144513 A1* | 5/2016 | Fukunaga | G05B 19/409 901/5 |
| 2016/0282845 A1* | 9/2016 | Toda | G05B 19/409 |
| 2017/0108984 A1* | 4/2017 | Takaya | G06F 3/0441 |
| 2017/0131798 A1* | 5/2017 | Geaghan | G06F 3/0441 |
| 2017/0153763 A1* | 6/2017 | Vavra | G06F 3/0442 |

FOREIGN PATENT DOCUMENTS

| | | | | |
|---|---|---|---|---|
| DE | 10296624 T5 | 4/2004 | | |
| DE | 102010025781 A1 | 1/2012 | | |
| DE | 102013013328 A1 | 2/2015 | | |
| EP | 2444866 A1 | 4/2012 | | |
| KR | 20140148474 A * | 12/2014 | | |
| KR | 20150036637 A * | 4/2015 | | |
| WO | WO-2007002967 A1 * | 1/2007 | ............ | B25J 9/1674 |
| WO | WO-2014012919 A1 * | 1/2014 | .......... | B25J 11/0005 |

OTHER PUBLICATIONS

Som Franz (WO2014012919A1); Reis Group Holding GMBH & Co KG; Method for Operating an Industrial Robot, and a Securemonitoring Device for Carrying out Said Method (Year: 2014).*
WO2007002967A1.translate; Schininger Manfred; Method for Establishing, Disconnecting and Operating a Temporary Active Connection Between a Mobile Operating Device and a Controllable Unit and Appropriately Configured Data-Transmission Remote Terminal. (Year: 2007).*
International Search Report and Written Opinion dated Nov. 2, 2017 for PCT/EP2017/061545.
Chinese Office Action dated Jun. 17, 2021 for Chinese Patent Application No. 201780029150.7.
US Office Action dated Jan. 19, 2022 for U.S. Appl. No. 16/091,584.
US Office Action dated Jul. 20, 2022 for U.S. Appl. No. 16/091,584.

* cited by examiner

MOBILE SECURITY BASIC CONTROL DEVICE COMPRISING A CODING DEVICE FOR A MOBILE TERMINAL WITH MULTI-TOUCHSCREEN AND METHOD FOR SETTING UP A UNIQUELY ASSIGNED CONTROL LINK

CROSS-REFERENCE TO RELATED APPLICATION

This is a continuation of U.S. patent application Ser. No. 16/091,584, entitled "Mobile Security Basic Control Device Comprising a Coding Device for a Mobile Terminal with Multi-Touchscreen and Method for Setting up a Uniquely Assigned Control Link", which is a 371 US national stage of PCT/EP2017/061545, filed May 12, 2017, which claims priority of DE102016208811.4, filed May 20, 2016, the disclosures of which are incorporated by reference herein in their entireties as if set forth at length.

BACKGROUND

The invention relates to a mobile safety basic control apparatus of a robot, having a handheld housing, an emergency stop switching means arranged on the housing, a communication apparatus for connecting the mobile safety basic control apparatus to a robot controller of the robot for control purposes, and having a holder, connected to the housing, that is configured for mounting the mobile safety basic control apparatus on a mobile terminal having a terminal controller and a multi-touchscreen configured to transmit inputs via the multi-touchscreen to the terminal controller.

DE 10 2010 025 781 A1 describes a portable safety input device having at least one input means for inputting a safety signal into a robot controller that has an interface for communication with a handheld device, connected, in particular detachably, to the safety input device, for controlling a robot by means of communication with this robot controller.

SUMMARY

It is an object of the invention to provide a mobile safety basic control apparatus of a robot having an interface by means of which the mobile safety basic control apparatus can be easily and securely connected to any commercially available mobile terminals that have a multi-touchscreen.

The object of the invention is achieved by a mobile safety basic control apparatus of a robot, having a handheld housing, an emergency stop switching means arranged on the housing, a communication apparatus for connecting the mobile safety basic control apparatus to a robot controller of the robot for control purposes, and having a holder, connected to the housing, that is configured for mounting the mobile safety basic control apparatus on a mobile terminal having a terminal controller and a multi-touchscreen configured to transmit inputs via the multi-touchscreen to the terminal controller, wherein the mobile safety basic control apparatus has a coding apparatus configured so as, in a state in which the safety basic control apparatus is mounted on the mobile terminal by means of the holder, to automatically transmit at least one identification code identifying the mobile safety basic control apparatus to the terminal controller via the multi-touchscreen.

The mobile safety basic control apparatus has at least one emergency stop switching means, operation of which results in the robot immediately being brought to a standstill, i.e. stopped using a safe technique. Besides the emergency stop switching means, the mobile safety basic control apparatus can also have at least one consent device, at least one mode selection means and/or a display means, in particular an illuminant.

At least the emergency stop switching means is connected using a safety technique to a robot controller of the robot for control purposes, specifically by the communication apparatus of the mobile safety basic control apparatus. Accordingly, the mobile safety basic control apparatus may be configured to communicate with the robot controller of the robot. The mobile safety basic control apparatus may be either connected to the robot controller by means of an electrical connecting line or connected to the robot controller by means of a wireless communication link.

The mobile safety basic control apparatus may be configured and/or set up to actuate the robot controller of the robot by means of the at least one emergency stop switching means, the at least one consent device and/or the at least one mode selection means, specifically even when the mobile safety basic control apparatus is separate from the mobile terminal.

The mobile safety basic control apparatus in an embodiment of this kind may thus be configured and/or set up for emergency stopping and for consent by the robot not only when the mobile safety basic control apparatus is mechanically connected to the mobile terminal, but may also be configured and/or set up for emergency stopping and/or for consent by the robot when the mobile safety basic control apparatus is remote from the mobile terminal, in particular has been removed therefrom. In such a case, a certain scope of basic control functions can be actuated using input means that are part of the mobile safety basic control apparatus. This may be in particular the aforementioned emergency stop switching means. Besides these, there may be further, possibly nonsecure, input means and/or display means provided on the mobile safety basic control apparatus. These may be one or more illuminants, switches, keys, in particular for menu control and for recording path points on a robot path to be programmed, and/or start/stop keys, for example.

The mobile safety basic control apparatus can in this respect form a basic control unit for the robot. Said basic control unit can provide a basic functionality for the robot, above all in respect of a safety functionality. The mobile safety basic control apparatus alone may be of inexpensive and standardized design. It is logically firmly connected to a particular associated robot. There may accordingly be one mobile safety basic control apparatus provided per robot. A logical association between the mobile safety basic control apparatus and a particular robot can be made by means of an identification code that is firmly implemented on the mobile safety basic control apparatus and is firmly associated with a particular robot.

The holder is used to allow the mobile safety basic control apparatus to be manually attached to a mobile terminal in a detachable manner. This means that the mobile safety basic control apparatus can be manually detached from the mobile terminal and also again manually fitted to the mobile terminal as required and desired by a person setting up and/or programming the robot. The holder may be configured such that the mobile safety basic control apparatus can be attached only at a quite specific point or at multiple specific points on the mobile terminal. Alternatively, the holder may be configured for attaching the mobile safety basic control apparatus to any points on the mobile terminal. The holder may in particular be configured for attaching the mobile safety basic control apparatus to an edge section of the mobile terminal.

In this case, the mobile safety basic control apparatus has a device section that covers at least part of the multi-touchscreen of the mobile terminal when the mobile safety basic control apparatus is attached to the mobile terminal by means of the holder.

The mobile terminal always has at least one multi-touchscreen, which is a touch-sensitive screen having multifinger gesture recognition. The touchscreen, with a capacitive or an optical effect, detects multiple touches, usually carried out with the fingers of a person, at the same time, as a result of which it is possible for more operator control methods to be used than in the case of systems that can detect only a single contact point at the same time. Instead of touching with the fingers of one hand, multi-touchscreens of this kind are also actuatable by other means, for example by touching the multi-touchscreen with a stylus, which is also referred to as an input stylus or in technical terminology as a "touchpen". Multi-touchscreens as such are known generally and may be configured according to U.S. Pat. No. 7,663,607 B2, for example. The mobile terminal may in particular be a smartphone or a tablet computer.

The terminal controller of the mobile terminal can be formed by a proprietary operating system or an open operating system and can comprise a computer program configured for controlling a robot. A computer program of this kind may be the actual robot control software or may be a shell configured for inputting and forwarding manually input information to the actual robot control software. In such a case, the robot control software can run in the robot controller physically separate from the mobile terminal, for example.

In the present exemplary application, the mobile terminal for its part may be connected to the robot controller for control purposes, such that operating input means of the mobile terminal allows the robot controller to be actuated in order to move or program the robot arm in an actuated manner. A connection for control purposes between the robot controller and the mobile terminal may be an electrical connection. In that case, the mobile terminal can communicate with the robot controller either wirelessly or by wire. The commands or signals transmitted to the robot controller via the mobile terminal can be transmitted using a safe technique or a non-safe technique. The mobile safety basic control apparatus with its safety-relevant operator control functionalities, such as the emergency stop switching means, for example, must always be securely connected to the robot controller, however. In this configuration, the robot can be controlled and programmed intuitively with very comprehensive functionality using user-individual graphical interfaces of the touchscreen, on the other hand. The multi-touchscreen of the mobile terminal accordingly forms a man-machine interface that a person can use to address the robot controller, on which multi-touchscreen it is possible for displays actuated by the robot controller to be depicted and on which multi-touchscreen it is possible for input means to be configured, operation of which results in appropriately associated functions and/or states being able to be triggered, altered and/or stopped, or activated or deactivated, on the robot controller.

As a result of the mobile safety basic control apparatus having a coding apparatus configured so as, in a state in which the safety basic control apparatus is mounted on the mobile terminal by means of the holder, to automatically transmit at least one identification code identifying the mobile safety basic control apparatus to the terminal controller via the multi-touchscreen, the mobile safety basic control apparatus can easily and securely be connected to the mobile terminal. As such, the identification code detected by the mobile terminal via the multi-touchscreen can be used to make the correct and explicit association between the mobile safety basic control apparatus and the mobile terminal, and as a result also the robot controller or the robot.

When the coding apparatus according to the invention has created the correct and explicit association between the mobile safety basic control apparatus and the mobile terminal, the mobile terminal now authorized by the coding apparatus can also be used for additional input actions. Additional input actions of this kind may be in a safe configuration by virtue of the input means themselves being coded or the input means having an associated coding, and therefore only authorized inputs being able to be performed on the mobile terminal.

In general, the coding apparatus can have two, in particular three or more, contact pins that, in a state in which the safety basic control apparatus is mounted on the mobile terminal by means of the holder, are in physical contact with the multi-touchscreen, specifically in a specific two-dimensional arrangement, representing the identification code, of the two or more contact pins on the multi-touchscreen.

The two or more contact pins are in this case configured to activate applicable area elements on the multi-touchscreen of the mobile terminal in order to be able to perform or simulate multiple contact at these points by means of the multi-touchscreen. Instead of actual contact with the fingers of a hand, the two or more contact pins are configured to actuate the multi-touchscreen in an analogous manner to touching the multi-touchscreen with two or more pins at the same time. The identification code can be generated by virtue of a particular number of contact pins being used and/or can be generated by virtue of the two or more contact pins being arranged at particular intervals from one another and/or being arranged in particular patterns that affect the multi-touchscreen and can be recognized, i.e. explicitly identified, by the terminal controller. The specific two-dimensional arrangement of the two or more contact pins that results in the identification code may thus be stipulated by the particular number of contact pins and/or by the particular intervals of the two or more contact pins from one another and/or by a particular pattern for the arrangement of the two or more contact pins.

The identification code represented by the two or more contact pins is detectable by the terminal controller when, in particular detectable by the terminal controller only when, the mobile safety basic control apparatus is mounted on and/or attached to the mobile terminal by means of the holder. The holder may in this case be configured for manually detachable attachment of the mobile safety basic control apparatus to the mobile terminal. The mobile safety basic control apparatus can thus be removed from the mobile terminal manually and also fitted or attached again as often as desired, in particular without needing tools in order to do so.

In a state in which the mobile safety basic control apparatus is removed from the mobile terminal, the two or more contact pins are not in contact with the multi-touchscreen of the mobile terminal and accordingly cannot affect the multi-touchscreen in the removed state of the mobile safety basic control apparatus, which means that in the removed state the mobile safety basic control apparatus is not detectable by the terminal controller.

The holder can be formed by a groove, formed in the housing of the mobile safety basic control apparatus, that has a first groove wall that, in a state in which the safety basic control apparatus is mounted on the mobile terminal, covers a section of the multi-touchscreen, wherein the first groove wall has the two or more contact pins arranged on it such that they are able to be in physical contact with the covered section of the multi-touchscreen, and the groove has a second groove wall, opposite the first groove wall, that, in a state in which the safety basic control apparatus is mounted on the mobile terminal, abuts a rear of the mobile terminal, opposite the multi-touchscreen, in order to hold the safety basic control apparatus against the mobile terminal.

The housing can have a bar-shaped basic shape. The housing can have a cylindrical, in particular circular cylindrical, outer wall and can have an applicable top wall and bottom wall. The top wall can have the emergency stop switching means arranged on it. The groove may be formed in the outer wall of the housing. The groove can be used to affix the mobile safety basic control apparatus to an edge section of the mobile terminal. In this case, the mobile safety basic control apparatus can encompass the edge section of the mobile terminal, specifically such that the mobile safety basic control apparatus covers a section of the multi-touchscreen. The groove can have a remaining apparatus that can interact with a mating latch apparatus that may be attached to the mobile terminal, so that when the mobile safety basic control apparatus is in a state affixed to the edge section of the mobile terminal, the mobile safety basic control apparatus is connected to the mobile terminal with a form fit and rigid fit.

As an alternative or in addition to a form-fit connection between the mobile safety basic control apparatus and the mobile terminal, the mobile safety basic control apparatus can also be connected to the mobile terminal with a force fit, for example by clamping. Such clamping can be produced by utilizing an elasticity between the mobile safety basic control apparatus and the mobile terminal, in particular also by utilizing an elasticity between two opposite groove faces of the groove in the mobile safety basic control apparatus and the surfaces of the mobile terminal. Clamping allows the mobile safety basic control apparatus to be fitted to any edge section or any edge of the mobile terminal, in particular also to a corner of the mobile terminal, regardless of the shape, the size, the model and/or the manufacturer of the mobile terminal.

As an alternative to rigid attachment by means of remaining apparatus and mating latch apparatus, the holder may be configured to mount the mobile safety basic control apparatus in a manner adjustable on an edge section of the mobile terminal. In particular, the mobile safety basic control apparatus may be mounted in a manner adjustable on an edge section of the mobile terminal such that the mobile safety basic control apparatus can be removed from a particular point on the edge section of the mobile terminal and put on again at another point on the edge section of the mobile terminal.

The holder may alternatively be configured to mount the mobile safety basic control apparatus in a manner displaceable along the edge section of the mobile terminal. To this end, the holder can have a guide groove, running parallel to the edge section in a state in which the mobile safety basic control apparatus has been put on the mobile terminal, that interacts with a strip, corresponding to the guide groove, on the mobile terminal, such that the mobile safety basic control apparatus is mounted and guided on the mobile terminal in a manner displaceable in rail-like fashion or slotted-guide-like fashion on the mobile terminal parallel to the edge section.

As an alternative to linearly displaceable mounting along the edge section of the mobile terminal, the holder may alternatively be configured to mount the mobile safety basic control apparatus in a rotatable manner on the mobile terminal. To this end, the holder may be configured to form a rotary joint between the mobile safety basic control apparatus and the mobile terminal, so that although the mobile safety basic control apparatus is mounted on the mobile terminal, it can be rotated relative to the mobile terminal.

The mobile safety basic control apparatus can have a manual operating means configured to move the two or more contact pins that are in physical contact with the multi-touchscreen on the basis of manual operation of the operating means on the multi-touchscreen. Such two or more contact pins of the operating means may be present on the mobile safety basic control apparatus in particular in addition to fixed contact pins that in this respect are independent of a position of the operating means and can form explicit reference pins. Both the two or more contact pins of the operating means and the fixed contact pins touch the multi-touchscreen in this case. As such, by way of example, it is possible to distinguish between (inadvertent or undesirable) adjustment, in particular rotation of the mobile safety basic control apparatus on the multi-touchscreen of the mobile terminal, and operation, in particular rotation of the operating means.

The fixed contact pins, in particular the reference pins, in this case ensure a safe association between mobile safety basic control apparatus and mobile terminal. The two or more contact pins of the operating means contain information about the position of the operating means both relative to the multi-touchscreen and relative to the housing of the mobile safety basic control apparatus.

If the mobile safety basic control apparatus is rigidly attached to the mobile terminal, then in a fundamental embodiment in which the two or more contact pins are rigidly attached to the mobile safety basic control apparatus, the two or more contact pins are initially connected so as to be in contact with a firmly defined point on the multi-touchscreen. If the mobile safety basic control apparatus is mounted on the mobile terminal in an adjustable, in particular rotatable or displaceable, manner, then in the fundamental embodiment in which the two or more contact pins are rigidly attached to the mobile safety basic control apparatus, the two or more contact pins are adjustable, in particular rotatable or displaceable, in contact with the multi-touchscreen. The mobile safety basic control apparatus can accordingly not only be positioned at a firmly defined point or at various discrete, freely selectable points on the mobile terminal, but rather can be positioned, in particular positioned by displacement, in a freely selectable manner on the entire edge region of the mobile terminal. Such adjustment and/or displacement also allows the surface design depicted on the multi-touchscreen to be adapted or altered as appropriate.

If the mobile safety basic control apparatus has a manual operating means, then the mobile safety basic control apparatus may be rigidly attached to the mobile terminal and the two or more contact pins can still be adjusted in contact with the multi-touchscreen, specifically by operating the manual operating means. By rotating or displacing the manual operating means, it is then possible for the two or more contact pins on the multi-touchscreen to be adjusted, specifically even if the housing of the mobile safety basic control apparatus is rigidly attached to the mobile terminal. For rotation, the manual operating means may be rotatably mounted on the housing of the mobile safety basic control apparatus. The manual operating means may in this respect be a rotary control. For displacement, the manual operating means may be displaceably mounted on the housing of the mobile safety basic control apparatus. The manual operating means may in this respect be a slide control. Despite displacement or rotation of the two or more contact pins, the coding, which may be stipulated by the particular number of contact pins and/or by the particular intervals of the two or more contact pins from one another and/or by a particular pattern of the arrangement of the two or more contact pins, is explicitly maintained.

The coding apparatus may have, in addition to the two or more contact pins configured so as, in a state in which the safety basic control apparatus is mounted on the mobile terminal by means of the holder, to transmit the at least one identification code identifying the mobile safety basic control apparatus to the terminal controller via the multi-touchscreen, further contact pins that are in physical contact with the multi-touchscreen and configured to form a pattern that takes its position and/or angular position on the multi-touchscreen as a basis for transmitting a piece of information associated with the respective position and/or angular position to the terminal controller.

Accordingly, besides the two or more contact pins that represent the identification code and are always completely in physical contact with the multi-touchscreen, additional, i.e. the further, contact pins may be present in order to be able to provide additional functions in addition to coding.

As a result of the further contact pins forming a pattern that, on the basis of its position and/or angular position on the multi-touchscreen, transmits a piece of information associated with the respective position and/or angular position to the terminal controller, it is possible for software slide controls and/or software rotary controls programmed in the terminal controller of the mobile terminal and depicted on the multi-touchscreen, for example, to be adjusted by displacing and/or rotating the mobile safety basic control apparatus or the operating means thereof these software slide controls and/or software rotary controls.

As such, a total of six software rotary controls can be programmed in the terminal controller and depicted on the multi-touchscreen, for example, said software rotary controls representing the six degrees of freedom, i.e. the six rotary joints or the six axes of a six-axis robot, for example. It is now possible for the mobile safety basic control apparatus to be put on one of the six depictions of the software rotary controls, as a result of which precisely this one axis of the six-axis robot is activated for manually commanded movement, for example by means of the identification code, when the mobile safety basic control apparatus is put on, and the other five software rotary controls, which are not provided with the mobile safety basic control apparatus, remain deactivated. By rotating the mobile safety basic control apparatus put on the mobile terminal or by rotating the operating means of the mobile safety basic control apparatus, it is now possible for the angular position value of the activated axis of the robot to be altered, for example altered in a robot program, and if need be also the actual axis position of the relevant joint of the robot to be set (simultaneously), i.e. for the robot to be moved as appropriate, which is then consistent with a manual driving mode. Manual displacement of the mobile safety basic control apparatus allows a change to be made for example from one, activated software rotary control to another software rotary control that is to be activated.

The terminal controller may alternatively be programmed such that rotating the mobile safety basic control apparatus put on the mobile terminal or rotating the operating means of the mobile safety basic control apparatus allows scrolling to be effected in a software menu depicted on the multi-touchscreen. In a modified embodiment, such scrolling in a software menu can also be effected by displacing the mobile safety basic control apparatus put on the mobile terminal instead of rotating it, however. Either by rotating or by displacing the mobile safety basic control apparatus or the manual operating means thereof, other parameters of the robot, of a programmed path or of a path to be programmed can also be set, such as a speed, a path parameter or a rigidity parameter of the robot, for example. If need be, rotating or displacing the mobile safety basic control apparatus or the manual operating means thereof also allows text inputs to be transmitted to the terminal controller and as a result to the robot controller, for example if the mobile safety basic control apparatus and/or the terminal controller is configured, in particular programmed, in the style of an inherently known, in technical terminology "Jog Dial", in the case of which rotating or displacing successively depicted letters or numbers allows the desired letter or the desired number to be selected.

In a specific variant embodiment, the further contact pins may be arranged on a rotary disk, mounted in a manually rotatable manner in the housing, that only partially or possibly even completely overlaps the multi-touchscreen, such that the angular position of the rotary disk is the basis for a different subset of the further contact pins being in physical contact with the multi-touchscreen and the respective complementary set of the further contact pins being outside the multi-touchscreen, or may at least not be in physical contact with the multi-touchscreen.

As a result of the angular position of the rotary disk being the basis for a different subset of the further contact pins being in physical contact with the multi-touchscreen and the respective complementary set of the further contact pins being outside the multi-touchscreen, a desired piece of information or action can be read in by the terminal controller via the multi-touchscreen from the number and orientation of the contact pins currently active on the multi-touchscreen in each case. The angular position of the rotary disk can be established, in particular automatically ascertained, by means of a comparison of the positions and/or orientations of the further contact pins on the multi-touchscreen in relation to the reference pins, which are fixed on the multi-touchscreen.

As an alternative or in addition to a manual operating means as described, the safety basic control apparatus can have a manual input means configured so as, in a first input means position, to bring the further contact pins into physical contact with the multi-touchscreen and, in a second input means position, to break the physical contact between the further contact pins and the multi-touchscreen.

In a specific embodiment of a manual input means, the safety basic control apparatus can have a manual input means having three successive input means positions, wherein in the second input means position a first group of further contact pins and a second group of further contact pins have had a physical contact with the multi-touchscreen broken, in the third input means position the first group of further contact pins is in physical contact with the multi-touchscreen and the second group of further contact pins has had a physical contact with the multi-touchscreen broken, and in the first input means position the first group of further contact pins and the second group of further contact pins are in physical contact with the multi-touchscreen The, in this respect, three-level manual input means can form a consent key of the robot, for example. In this case, in the second input means position, in which a first group of further contact pins and a second group of further contact pins have been broken from physical contact with the multi-touchscreen, can form a switching position of the consent key that signals that the robot is not enabled for movement, for example. In the third input means position, in which the first group of further contact pins is in physical contact with the multi-touchscreen and the second group of further contact pins has been broken from physical contact with the multi-touchscreen, can form a switching position of the consent key that signals that the robot is now enabled for movement. In the first input means position, in which the first group of further contact pins and the second group of further contact pins are in physical contact with the multi-touchscreen, can form a switching position of the consent key that is consistent with an inherently known panic switching position and that means that the user has operated the consent key too heavily in fright, consequently resulting in a signal being sent indicating that the robot needs to be brought to a standstill, i.e. stopped.

The two or more contact pins and/or the further contact pins can be brought into physical contact with the multi-touchscreen by mechanically pressing the respective contact pins onto the multi-touchscreen, and the physical contact can be broken by mechanically removing the contact pins from the multi-touchscreen.

The mobile safety basic control apparatus can have a multidimensional operating means or a multidimensional input means. The operating means or the input means may be configured as a joystick, a 3D mouse or a 6D mouse, for example.

The mobile safety basic control apparatus can additionally have a luminous ring constructed from multiple individually actuatable luminous segments, and the mobile safety basic control apparatus may in this case be set up to take a switching state transmitted to the terminal controller via the multi-touchscreen by the two or more contact pins and/or the further contact pins as a basis for actuating the individual luminous segments of the luminous ring in a specific manner. The luminous segments can be formed by LEDs, for example.

The invention accordingly also relates to a method for setting up an explicitly assigned control connection between a mobile safety basic control apparatus, in particular a mobile safety basic control apparatus as described according to the invention on the basis of one or more embodiments, and a mobile terminal having a multi-touchscreen, having the steps of:
  transmitting an identification code from the mobile safety basic control apparatus to the mobile terminal by virtue of the identification code being automatically input and transmitted by the mobile safety basic control apparatus as a multitouch input on the multi-touchscreen of the mobile terminal by virtue of the safety basic control apparatus being put onto the mobile terminal,
  identifying the mobile safety basic control apparatus by means of a terminal controller of the mobile terminal on the basis of the transmitted identification code,
  enabling function control input means of the mobile terminal by means of the terminal controller in order to actuate functions of a robot associated with the mobile safety basic control apparatus.

A development of the method has the step of:
  transmitting the identification code in the form of a specific two-dimensional arrangement of multiple touch contact points on the multi-touchscreen of the mobile terminal, in particular characterized by the number of touch contact points, by the relative orientations of multiple touch contact points in relation to one another and/or by the orientation of a group of multiple touch contact points in contact with the multi-touchscreen of the mobile terminal.

The invention is explained further, sometimes in other words, below, with other terms also being used for the components according to the invention.

The mobile safety basic control apparatus may be connected to the robot controller by wire or wirelessly, in each case using a safe technique, in particular according to EN ISO 10218-1. If the mobile safety basic control apparatus is removed from the configured surroundings of the robot controller, this results in an emergency stop for the robot, the robot cell and/or the robot installation, unless said mobile safety basic control apparatus has been safely disconnected beforehand by means of a suitable method. The mobile safety basic control apparatus can also have additional basic functionalities besides the essential basic operator control elements such as emergency off, consent key and program start key. These could be further keys for programming functions for teaching the robot, for example, and could in particular also comprise a small display for displaying status reports, menu entries or options. A selection can also be made using a combined rotary/push key. There may additionally be a visual display means, such as an illuminant, for example an LED, a light ring and/or a light strip, for displaying.

The aim in this case is not to equip the basic operator control unit with as large a scope of functionality as possible, but rather to ensure simple and intuitive basic operation in a minimalistic and inexpensive manner. By contrast, however, the mobile terminal with its individual and arbitrarily extendible functionality, such as, in the case of a tablet computer, for example, the user interface of the multi-touchscreen, then has a very high level of functionality and, for the operator, a high temporary value at the robot when demanding programming, setup or service work needs to be performed on the robot, for example.

In a specific embodiment, the mobile safety basic control apparatus can have just a single additional input means besides an emergency stop key, which is always present. This single additional input means can be the consent key. Instead of a consent key, a single input pair may be provided that can be used universally and can have a function that can be changed over depending on the situation. The mobile safety basic control apparatus has a secure wire or radio link to the robot controller and can be manually coupled mechanically to any mobile terminal, such as a tablet computer, for example, by the user. To this end, the mobile safety basic control apparatus can be clamped onto the edge of the tablet computer or of a smartphone so that it encloses the top and bottom of the tablet computer or smartphone.

A crucial aspect is that not only does the mobile safety basic control apparatus abut the edge or the frame of the tablet computer or smartphone or is clamped to this edge or frame, but the mobile safety basic control apparatus also projects over a subsection of the multi-touchscreen, so that the coding apparatus, in particular the two or more contact pins of the mobile safety basic control apparatus, can touch the multi-touchscreen on this subsection.

The coding area that can be formed by the two or more contact pins can consist of a geometrically defined arrangement of two or more elevations that may be slightly electrically charged and conductive. The two or more contact pins may be spring loaded in an axial direction, i.e. in a longitudinal extent of the contact pins, so that there is always the assurance that the contact pins are safely resting on the multi-touchscreen. A clamping force on the top of the multi-touchscreen can be exerted by means of an offset area section beside the contact pins. These elevations can be detected by a capacitive multi-touchscreen, for example. Modern multi-touch technology widely used today detects both the quantity and the position of all elevations. Additionally, normal touch control on the display panel not covered by the mobile safety basic control apparatus is possible without any problem. Modern multi-touchscreens can process ten or more simultaneous touch commands. The resolution of the multi-touchscreen is very fine in this case considering how accurately it is possible to draw using a stylus input device.

The explicit identification code, in particular the coding pattern, may be similar to a highly simplified QR code, for example, which coding pattern cannot be imitated by pressing the multi-touchscreen using the fingers as appropriate. As such, the contact pins of the coding apparatus may be so close to one another that they are closer together than the width of a narrow fingertip, for example.

The coded operation of the multi-touchscreen using the specific coding area is subsequently also called code touch functionality. This results in very advantageous fundamental properties of the invention.

The detection of the coding area on the tablet computer or on the smartphone makes it possible to ensure that the tablet computer or the smartphone is currently equipped with the requisite safety apparatuses, such as e.g. the emergency stop key. As a result, functions and virtual buttons permitting manual operation of the robot can be enabled on the user interface of the multi-touchscreen. Besides detection of the fact that the mobile safety basic control apparatus is coupled to the mobile terminal, it is also possible to detect the point on the multi-touchscreen at which the mobile safety basic control apparatus has been affixed to the mobile terminal. This can mean that a graphical depiction on the multi-touchscreen can alter, adapt and/or change, depending on the point at which the mobile safety basic control apparatus has been put onto the mobile terminal. This is automatically detected by means of the coding area, in particular the coding pins. The surface of the mobile terminal therefore reacts to the docked state and the docked position of the mobile safety basic control apparatus and can select and/or provide particular functions and/or parameters. As such, depending on whether the mobile safety basic control apparatus has been affixed on a right-hand side of the mobile terminal or has been affixed on a left-hand side of the mobile terminal, for example, a respective input surface can be displayed that is optimized for operation by right-handed or left-handed people. As such, important functional areas and/or touch input means can be displayed on the left-hand or right-hand side of the multi-touchscreen in this case, for example.

Depending on the position of the coding area on the multi-touchscreen, the universal mobile safety basic control apparatus can be assigned different functions. Quickly moving or pushing the mobile safety basic control apparatus to a different position at the edge of the tablet computer or of the smartphone can be used to automatically also change the function of the hardware key of the mobile safety basic control apparatus. As such, it is possible to change over between the axes of the robot when manually moving the robot arm on an axis-specific basis, for example. A rotary or touch-control key then always moves that axis whose display panel has the coding apparatus, i.e. the contact pins or the coding area, on it, for example. The same also applies to moving the robot arm in a Cartesian coordinate system.

Alternatively or additionally, the speed of movement when manually moving the robot or in test mode can be set using the hardware key, for example. It is alternatively possible for the hardware input element to be used to start and stop the program cycle in the test mode. Alternatively or additionally again, parameter settings can be adjusted using the mobile safety basic control apparatus on the multi-touchscreen of the tablet computer or the smartphone.

An adjustment of parameters and their reference to the associated limit values can be visualized, i.e. displayed, either on the mobile safety basic control apparatus or on the display of the multi-touchscreen of the tablet computer or of the smartphone, for example by means of a visual display apparatus.

In an alternative embodiment of the mobile safety basic control apparatus having a multidimensional input means, for example having a combination of rotary/press movement or having a 3D/6D mouse, it is also possible for further functions, such as multidimensional movement of the robot arm or of a mobile platform, to be realized. This is effected by virtue of this function being enabled as soon as the coding area is detected on the appropriate display panel of the multi-touchscreen of the tablet computer or of the smartphone.

Variations in the arrangement of the contact pins on the coding area allow different input devices to be detected by the tablet computer or by the smartphone and explicitly associated the associated robot cell. The coding area therefore has as unique an effect as a fingerprint.

Depending on the mechanical coupling between the mobile safety basic control apparatus and the mobile terminal, drag movements for the mobile safety basic control apparatus along an edge of the mobile terminal are also possible, which can be used in the manner of a slide control. This may require additional strips to be present on or to have to be added to the mobile terminal so that the mobile safety basic control apparatus can be pushed on the mobile terminal smoothly and accurately, but cannot slip out or drop off.

As described, operation or keyed input can be effected not only using the touch display but also by means of separate hardware keys of the mobile safety basic control apparatus with ideal haptic feedback. The touchscreen is nevertheless used for identifying and changing over between functions and for detecting the connection of the individual mobile safety basic control apparatus.

As an alternative to separate hardware keys, the coding area according to the invention on the mobile safety basic control apparatus can also be used to set up passive keys based on the already existing design of software keys. These keys press on the multi-touchscreen directly and activate the applicable underlying command. Instead of a two-dimensional or punctiform contact point, it is also possible for a coding area to be used that uses the key/lock principle to enable the respective function only if it is activated via the mobile safety basic control apparatus on the multi-touchscreen.

As described, consent keys can be mapped onto the multi-touchscreen. A mechanical, for example rubbery, key having multiple contact pins directed onto the multi-touchscreen can be pressed by the user such that all the contact pins touch the multi-touchscreen. The complete coding of the contact pins that is detected by the terminal controller then enables the drives of the robot. Further pressing (panic mode) either presses additional contact pins onto the multi-touchscreen or alternatively lifts a few contact pins that are already on off again, so that in both cases the coding in the panic mode changes and the enabling of the drive of the robot is canceled. When the key is released, all contact pins lift up from the multi-touchscreen. For safety reasons, fresh enabling of the motors of the robot first of all has the control requirement of the contact pins being lifted up completely in this manner or the key being manually released completely. Only thereafter is the enabling code for the contact pins able to be used again. All states can be distinguished from one another in a haptically clear manner on the mobile safety basic control apparatus on the basis of the mechanical form of the key, even though the actual input is made on the multi-touchscreen. Mechanically, this key with its explicitly distinguishable three states and its dual design, i.e. a simultaneous change of contact for in each case a multiple contact pin per state, meets all the demands on keys using a safe technique. From the point of view of software, applicable algorithms can then also evaluate the coded touch pattern using a safe technique, for example by means of redundant and possibly diversity-based program codes and/or processors. This safe technique can then be used to safely forward the information to the robot controller or to return it to the mobile safety basic control apparatus.

Fundamental contact pins may be constantly in contact with the multi-touchscreen at the very time at which the mobile safety basic control apparatus is coupled to the mobile terminal, even if a key on the mobile safety basic control apparatus is not operated. These fundamental contact pins signal to the mobile terminal the presence of the mobile safety basic control apparatus and implicitly identify the robot that is firmly associated with the mobile safety basic control apparatus.

Further embodiments of keys or switches using a safe technique or multidimensional input means may be optionally present, as may rotary selection wheels, for example using the absolute value detection for the angular position. Also, besides multi-touch technology, the force touch technology of the latest touchscreens can also be used, which can distinguish between locally different pressures on the touchscreen. This technology, by contrast with standard multi-touch technology, still has a much lower local resolution on the multi-touchscreen to date.

Considered in summary, the mobile safety basic control apparatus according to the invention can allow generally known mobile terminals, such as smartphones and tablet computers, having a multi-touchscreen to be used with robot-specific safety functionality. In this case, the established multi-touch functionality of smartphones and tablet computers is used to identify and locate a docked mobile safety basic control apparatus safety, explicitly and automatically using specific coding areas, in particular the contact pins. The user interface and the functions of the hardware input element can be depicted on the multi-touchscreen in different ways according to the respectively chosen position of the mobile safety basic control apparatus.

Several specific exemplary embodiments of the invention are explained in more detail in the description below with reference to the appended figures. Specific features of these illustrative exemplary embodiments can depict general features of the invention regardless of the specific context in which they are mentioned, possibly even when considered individually or in further combinations.

DETAILED DESCRIPTION

Figure 1:
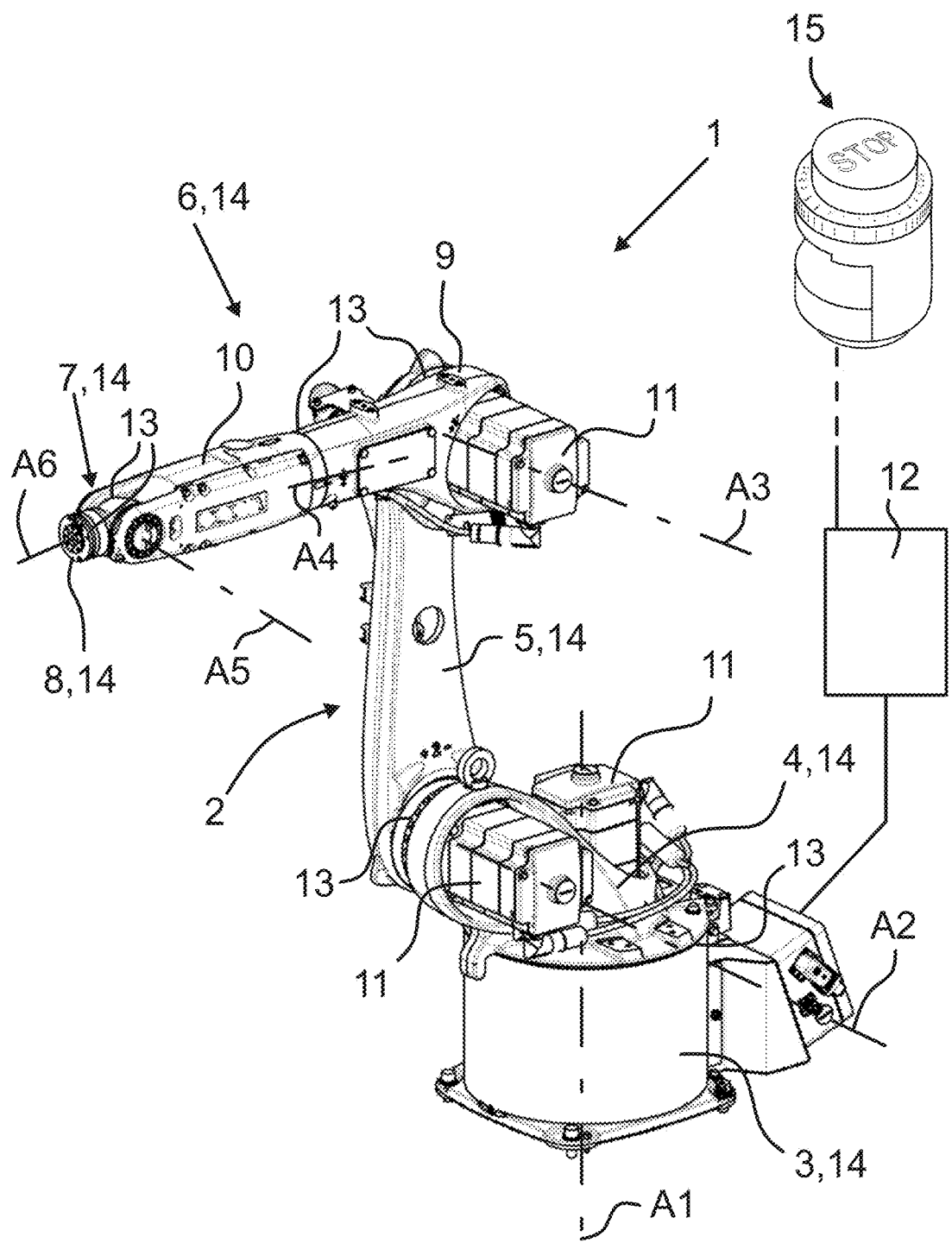
FIG. 1 shows a schematic depiction of a robot having a robot arm and a robot controller, and also an exemplary embodiment of a mobile safety basic control apparatus according to the invention.

FIG. 1 shows a robot 1 having a robot arm 2 and a robot controller 12. In the case of the present exemplary embodiment, the robot arm 2 comprises multiple members 14 arranged in succession and connected by means of joints 13.

The members 14 are in particular a frame 3 and a carousel 4 mounted in a manner rotatable relative to the frame 3 about a vertically running axis A1. Further members of the robot arm 2 in the case of the present exemplary embodiment are a swing arm 5, an arm boom 6 and a preferably multiaxis robot hand 7 having an attachment apparatus, embodied as a flange 8, for attaching an end effector, which is not depicted in more detail. The swing arm 5 has the lower end, e.g. a swing arm support head, not depicted in more detail, mounted on the carousel 4 in a manner swivelable about a preferably horizontal rotation axis A2. At the upper end of the swing arm 5, the arm boom 6 is mounted again in a manner swivelable about a likewise preferably horizontal axis A3. The end of said arm boom carries the robot hand 7 with its preferably three rotation axes A4, A5, A6.

The arm boom 6 in the case of the present exemplary embodiment has an arm housing 9 mounted swivelably on the swing arm 5. On the arm housing 9, there is a hand basic housing 10 of the arm boom 6 mounted in a manner rotatable about the axis A4.

The robot arm 2 is mobile in its three basic axes by means of three electric drive motors 11 and in its three hand axes by means of three further electric drive motors.

The robot controller 12 of the robot 1 is configured or set up to execute a robot program by means of which the joints 14 of the robot arm 2 can be adjusted or moved in rotation in a manner automated according to the robot program or automatically in a manual driving mode. To this end, the robot controller 12 is connected to the actuatable electric drive motors 11, which are configured to adjust the joints 14 of the robot arm 2. The robot controller 12 has a mobile safety basic control apparatus 15 according to the invention connected to it for control purposes.

FIG. 2 to FIG. 16 show the mobile safety basic control apparatus 15, which has a handheld housing 16, an emergency stop switching means 17 arranged on the housing 16, and a communication apparatus 18 for connecting the mobile safety basic control apparatus 15 to the robot controller 12 (FIG. 1) for control purposes. Moreover, the mobile safety basic control apparatus 15 has a holder 19 connected to the housing 16. The holder 19 is configured for mounting the mobile safety basic control apparatus 15 on a mobile terminal 20 (FIG. 4). The mobile terminal 20 has a terminal controller 21 and a multi-touchscreen 22. The multi-touchscreen 22 is configured to transmit inputs, i.e. information, data about the multi-touchscreen 22, to the terminal controller 21.

Figure 3:
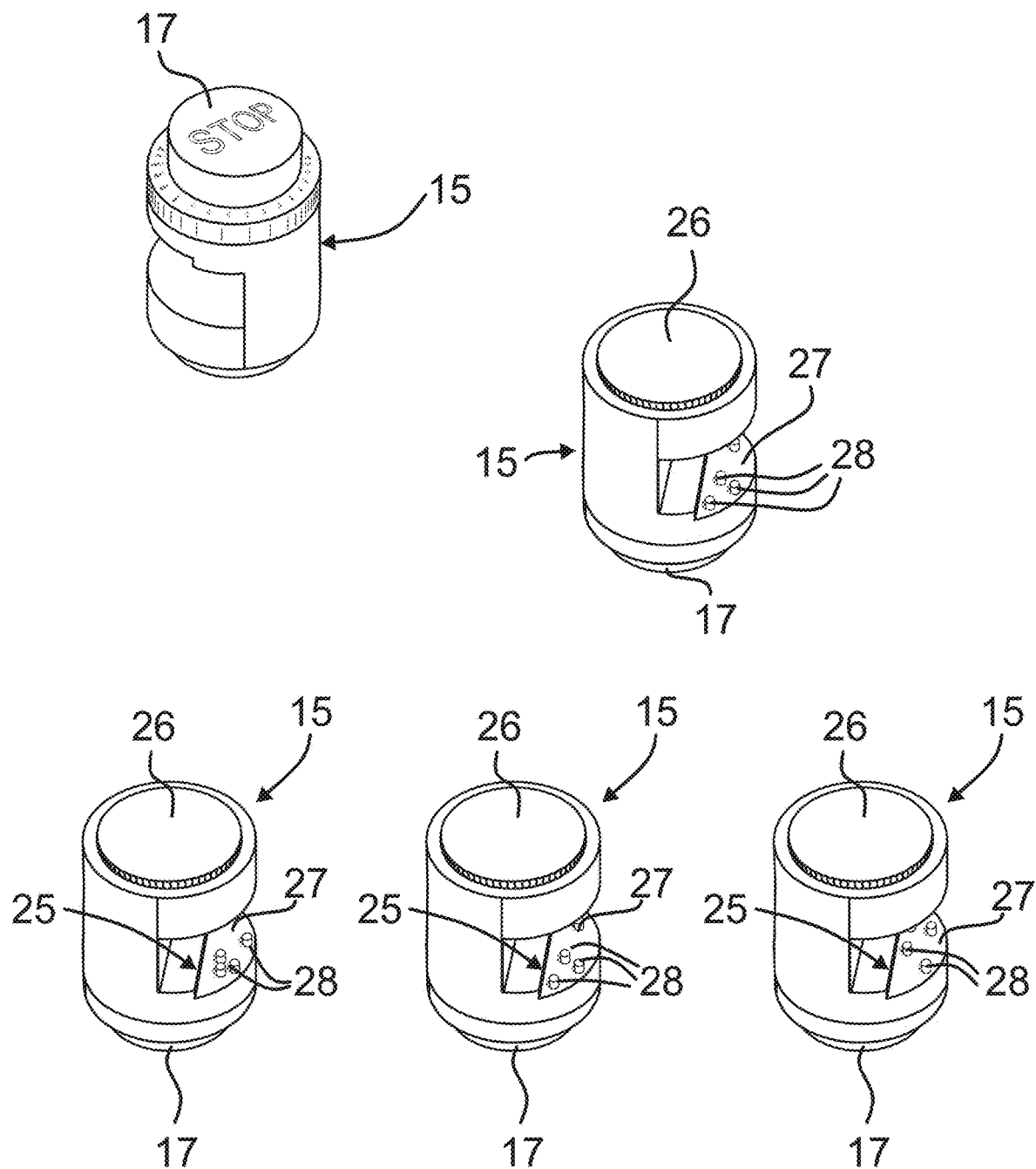
FIG. 3 shows perspective views of the mobile safety basic control apparatus both from above and from below, and also three variant embodiments with different identification codes.
Figure 4:
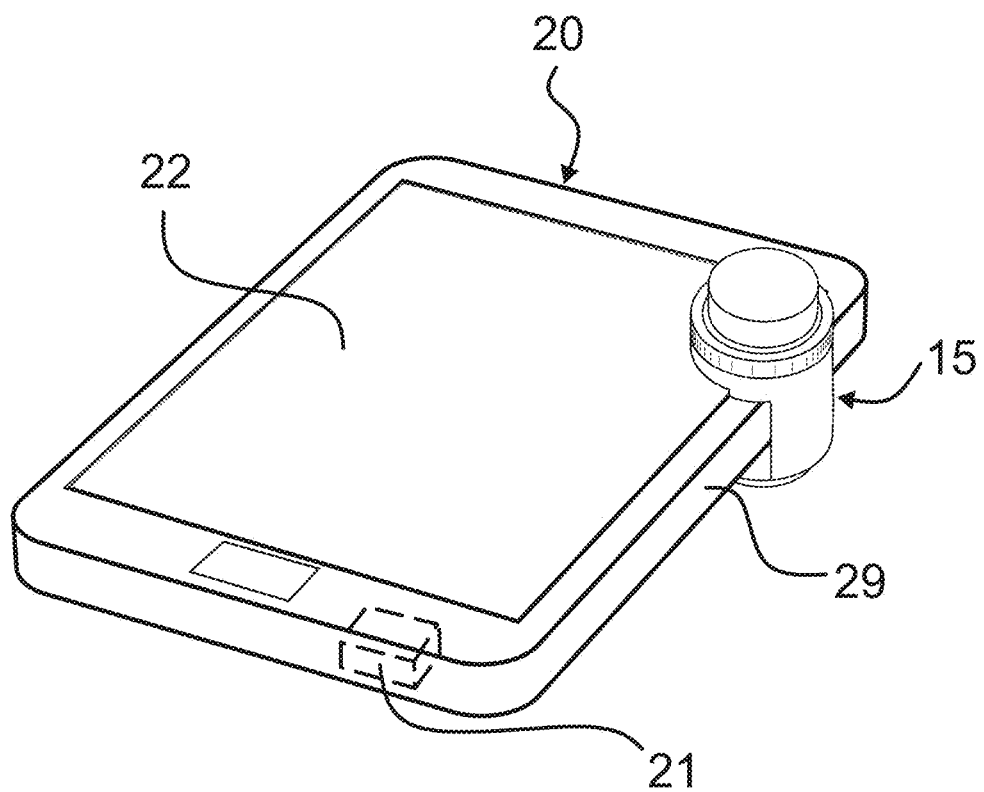
FIG. 4 shows a perspective view of an exemplary mobile terminal in a style of a tablet computer with the mobile safety basic control apparatus in a state fitted to the mobile terminal.
Figure 5:
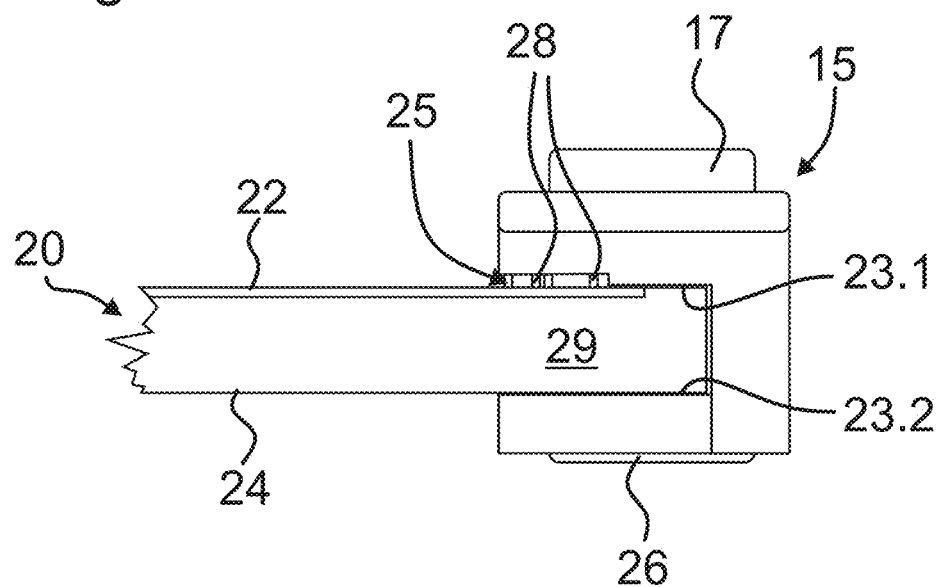
FIG. 5 shows a sectional depiction of a region of the mobile terminal on which the mobile safety basic control apparatus is fitted to the mobile terminal.
Figure 6:
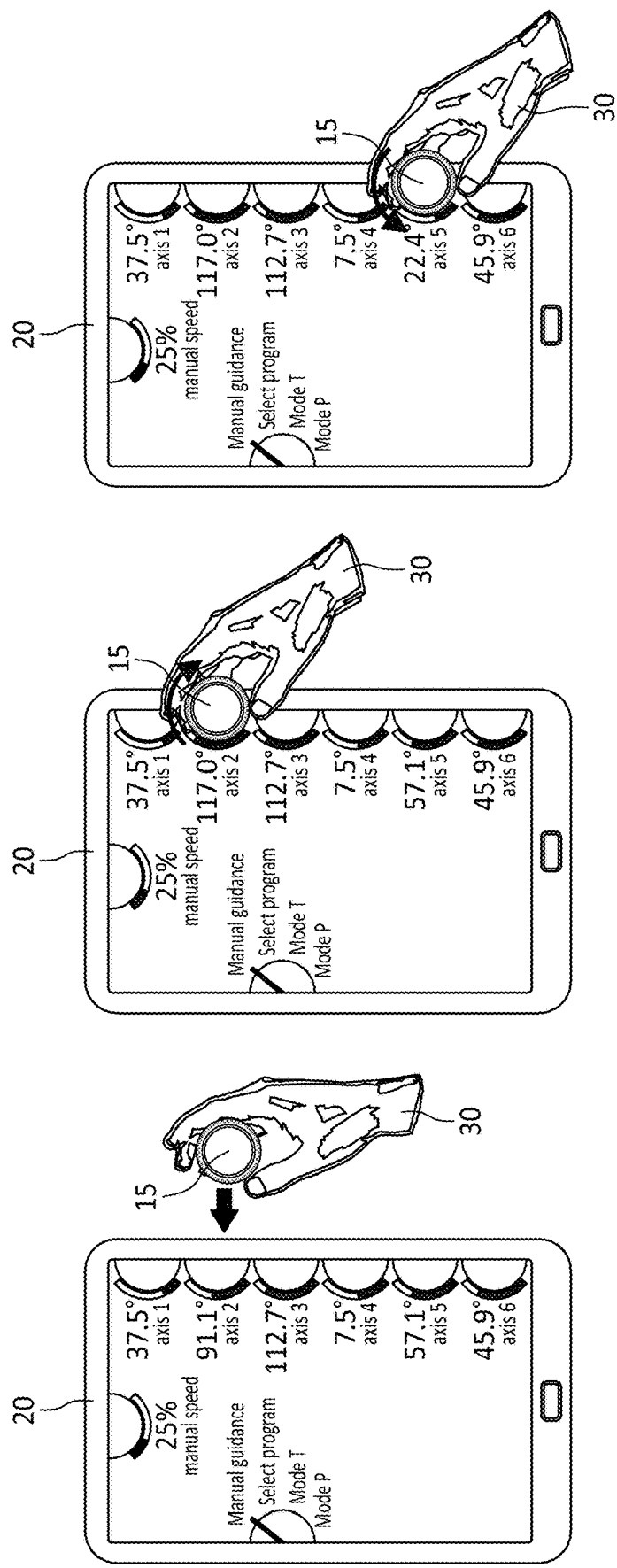
FIG. 6 shows a first embodiment of the mobile terminal, in the case of which the terminal controller is configured to display robot axes on the multi-touchscreen that are able to be adjusted by the mobile safety basic control apparatus.
Figure 7:
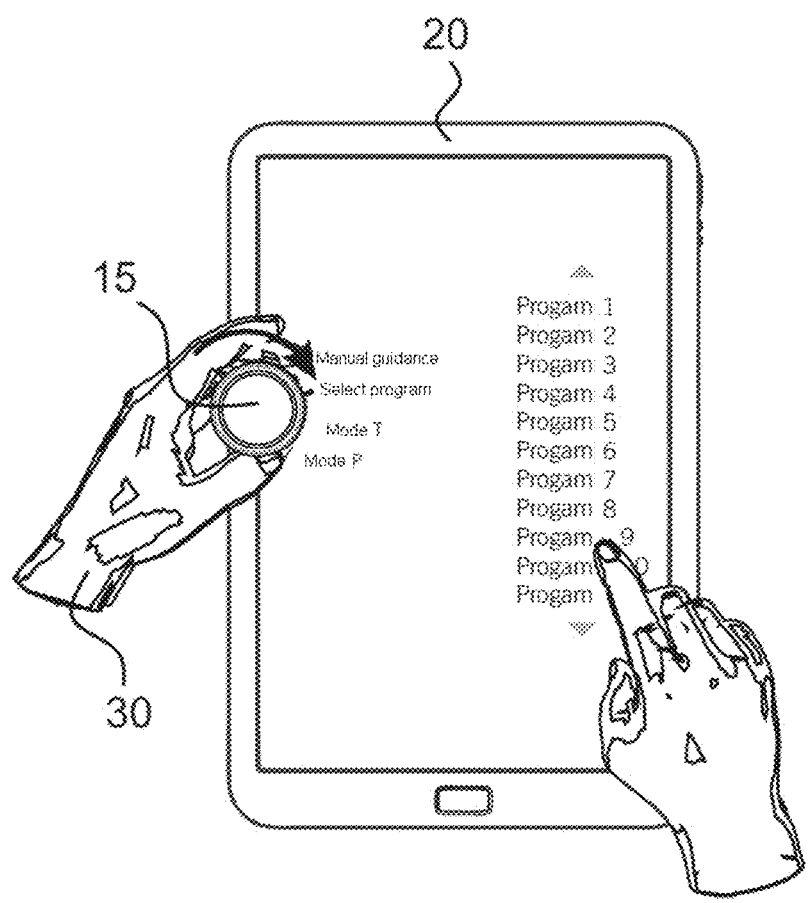
FIG. 7 shows a second embodiment of the mobile terminal, in the case of which the terminal controller is configured to display a menu on the multi-touchscreen allowing the menu or a menu item to be selected by the mobile safety basic control apparatus.
Figure 8:
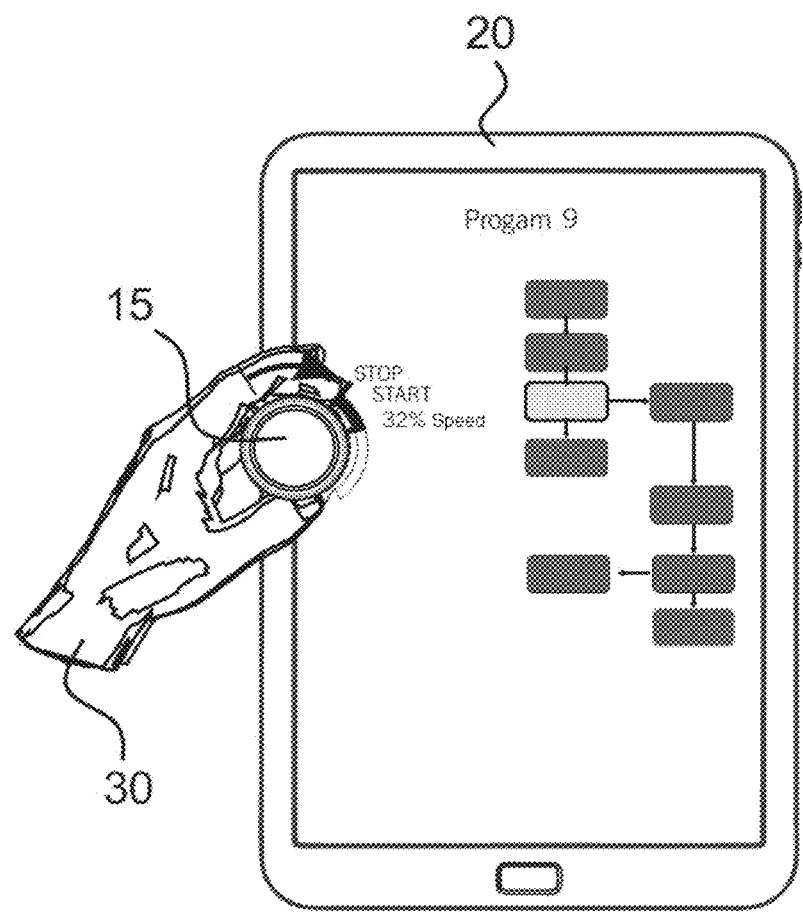
FIG. 8 shows a third embodiment of the mobile terminal, in the case of which the terminal controller is configured to display a robot program having program steps on the multi-touchscreen allowing the robot program or a program step to be selected by the mobile safety basic control apparatus.
Figure 9:
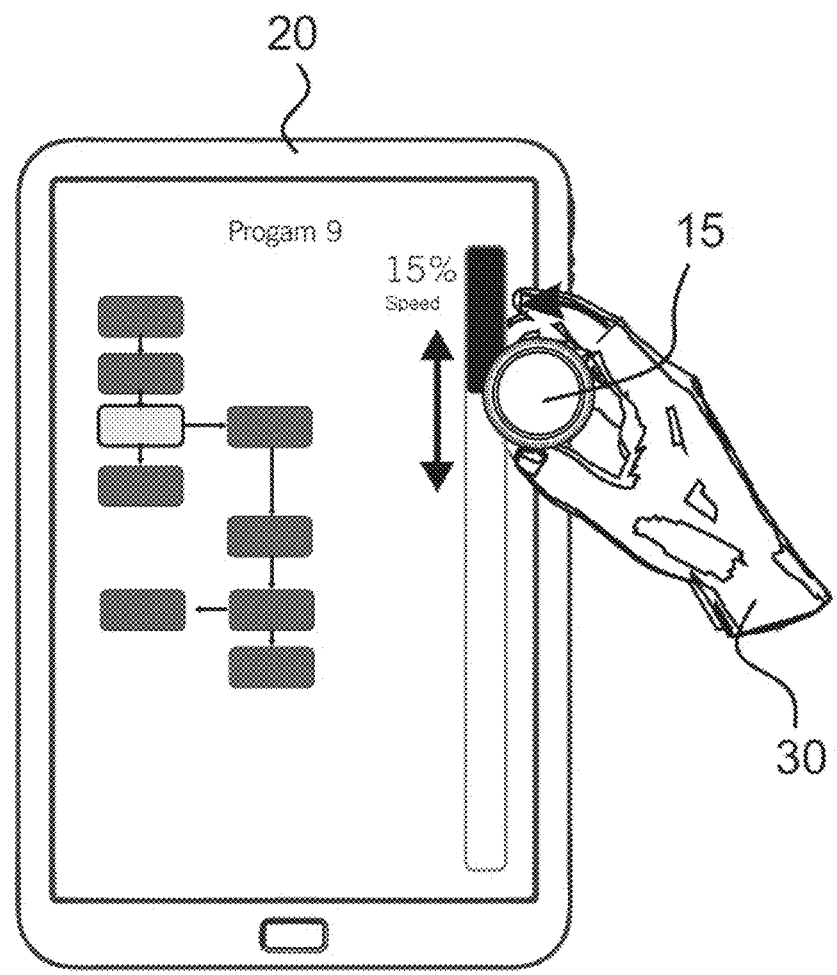
FIG. 9 shows a fourth embodiment of the mobile terminal, in the case of which the terminal controller is configured to display a speed bar or a slider on the multi-touchscreen, wherein the speed bar or the slider can be adjusted by the mobile safety basic control apparatus.

In the case of the present exemplary embodiment, in particular as depicted in FIG. 2 to FIG. 5, the holder 19 is formed by a groove 23, formed in the housing 16 of the mobile safety basic control apparatus 15, having a first groove wall 23.1 that covers a section of the multi-touchscreen 22 in a state, as shown in FIG. 4 and FIG. 5, in which the safety basic control apparatus 15 is mounted on the mobile terminal 20. The groove 23 moreover has a second groove wall 23.2, opposite the first groove wall 23.1, that abuts a rear 24 of the mobile terminal 20, opposite the multi-touchscreen 22, in a state in which the safety basic control apparatus 15, as depicted in particular in FIG. 4 and FIG. 5, is mounted on, i.e. affixed to, the mobile terminal 20, in order to hold the safety basic control apparatus 15 on the mobile terminal 20.

According to the invention, the mobile safety basic control apparatus 15 has a coding apparatus 25 configured so as, in a state in which the mobile safety basic control apparatus 15, as shown in particular in FIG. 4 and FIG. 5, is mounted on the mobile terminal 20 by means of the holder 19, to automatically transmit at least one identification code identifying the mobile safety basic control apparatus 15 to the terminal controller 21 via the multi-touchscreen 22.

Figure 2:
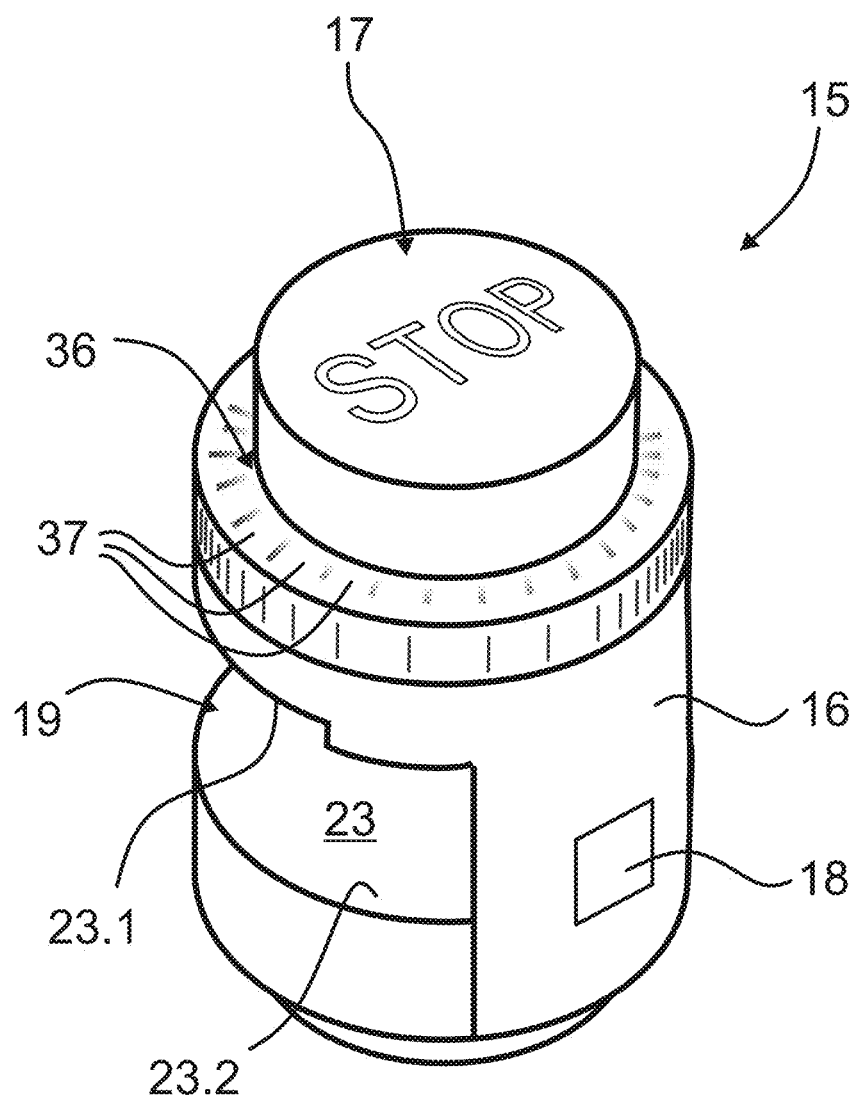
FIG. 2 shows a perspective view of the mobile safety basic control apparatus alone from above.

The topmost depiction in FIG. 3 shows the mobile safety basic control apparatus 15 shown in FIG. 2 in a view from above. On the top of the mobile safety basic control apparatus 15, there is the emergency stop switching means 17. In the depiction halfway down in FIG. 3, the mobile safety basic control apparatus 15 shown in FIG. 2 is depicted on its head, i.e. the emergency stop switching means 17 points downward and a base area 26 of the mobile safety basic control apparatus 15 points upward. In the bottom row of FIG. 3, three exemplary coding apparatuses 25 are shown that have different identification codes. In the case of the present exemplary embodiment, the different identification codes are formed by contact pins 28 arranged differently on an inner area 27 of the mobile safety basic control apparatus 15.

In the case of the present exemplary embodiment, multiple contact pins 28 are accordingly arranged on the first groove wall 23.1, such that they are in physical contact with the covered section of the multi-touchscreen 22, as shown in particular in FIG. 5, when the mobile safety basic control apparatus 15 is mounted on the mobile terminal 20. The coding apparatus 25 thus has two or more contact pins 28 that, in a state in which the safety basic control apparatus 15 is mounted on the mobile terminal 20 by means of the holder 19, are in physical contact with the multi-touchscreen 22, specifically in a specific two-dimensional arrangement, representing the identification code, of the two or more contact pins 28 on the multi-touchscreen 22.

The holder 19 is configured to mount the mobile safety basic control apparatus 15 on an edge section 29 of the mobile terminal 20. In this case, the holder 19 may be configured to mount the mobile safety basic control apparatus 15 in a manner adjustable on the edge section 29 of the mobile terminal 20, as illustrated in the depictions of FIG. 6 to FIG. 9. As such, the mobile safety basic control apparatus 15 can be selectively put at different positions on the mobile terminal 20 and removed again by means of one hand 30 of a user.

Figure 10:
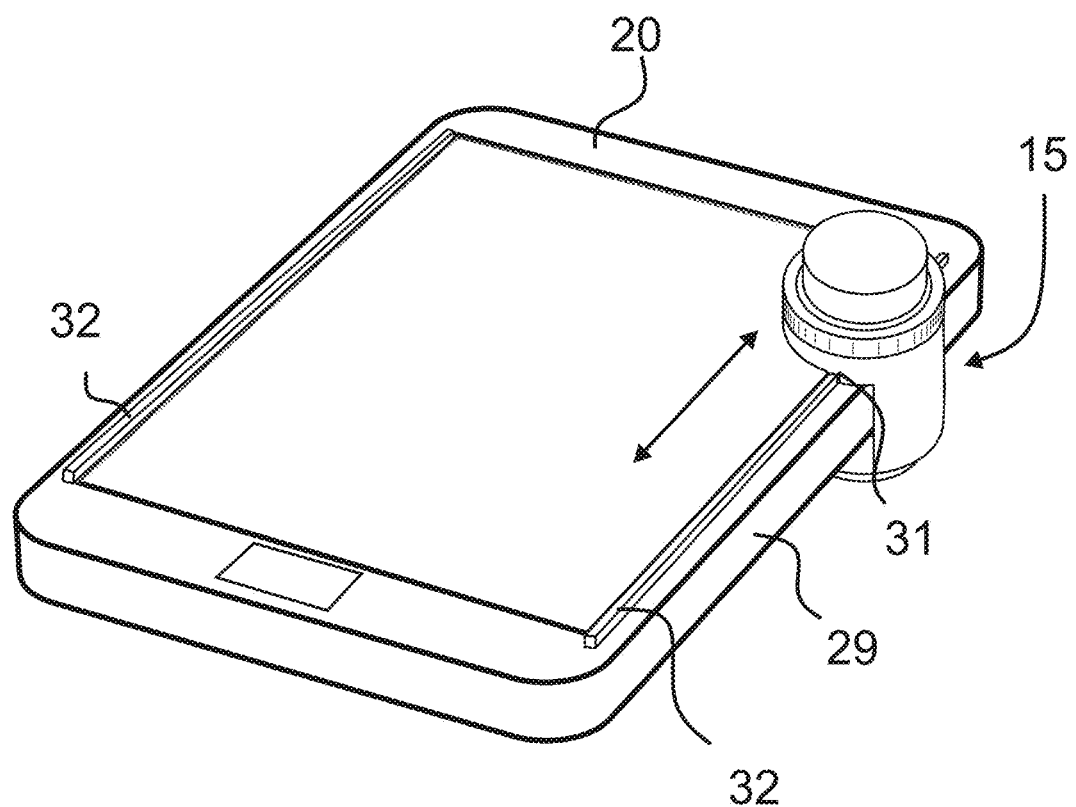
FIG. 10 shows a variant embodiment of the mobile terminal, in the case of which the mobile safety basic control apparatus is mounted on the mobile terminal in a manner linearly adjustable in the style of a slider.

In a specific embodiment, it is possible, as shown in FIG. 10, for example, for the holder 19 to be configured to mount the mobile safety basic control apparatus 15 in a manner displaceable along the edge section 29 of the mobile terminal 20. To this end, the holder 19 can have a guide groove 31, running parallel to the edge section 29 in a state in which the mobile safety basic control apparatus 15 has been put on the mobile terminal 20, that interacts with a strip 32, corresponding to the guide groove 31, on the mobile terminal 20, such that the mobile safety basic control apparatus 15 is mounted and guided on the mobile terminal 20 in a manner displaceable in rail-like or slotted-guide-like fashion, as indicated by the arrow in FIG. 10, on the mobile terminal 20 parallel to the edge section 29.

Figure 11:
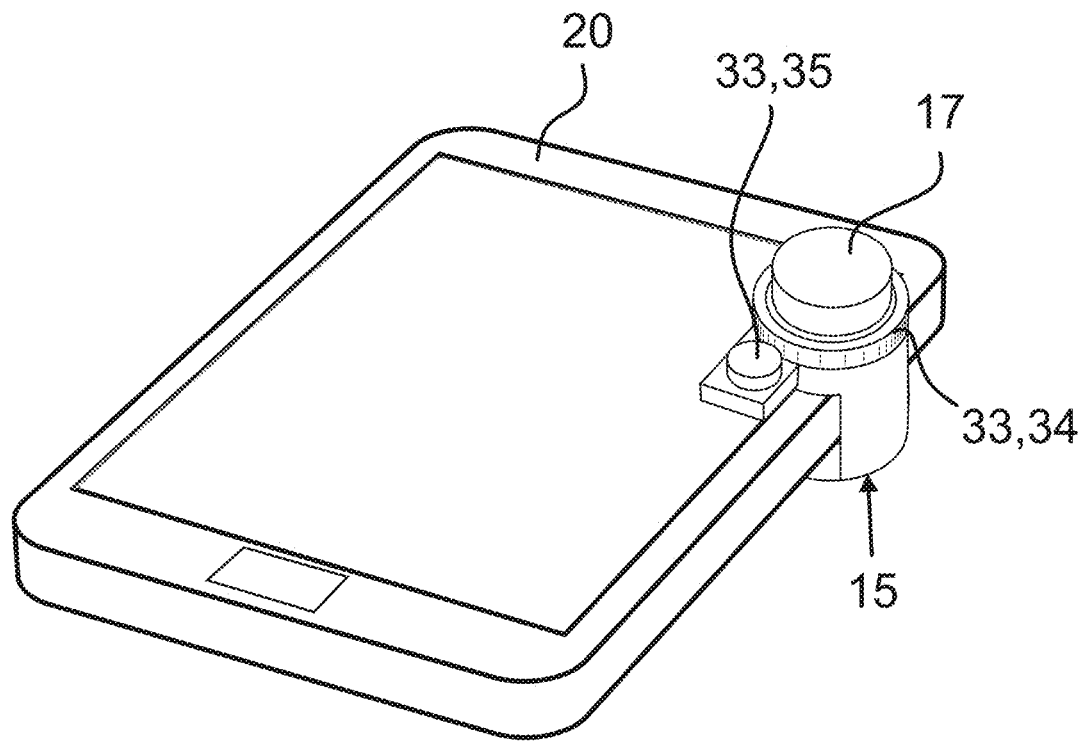
FIG. 11 shows a variant embodiment of the mobile safety basic control apparatus that has an input means in the style of a consent switch.

In the case of the modified exemplary embodiment of FIG. 11, the safety basic control apparatus 15 has not only the emergency stop switching means 17 but also manual operating means 33 configured to bring two or more contact pins 28a, 28b into physical contact with the multi-touchscreen 22, or to adjust their respective touching arrangement on the multi-touchscreen 22, on the basis of manual operation of the respective operating means 33. In such a variant of a manual operating means 33, a consent key and/or a rotary disk (rotatable operating means) can be formed, for example, as explained in even more detail in particular with reference to FIG. 15 and FIG. 16.

Figure 12:
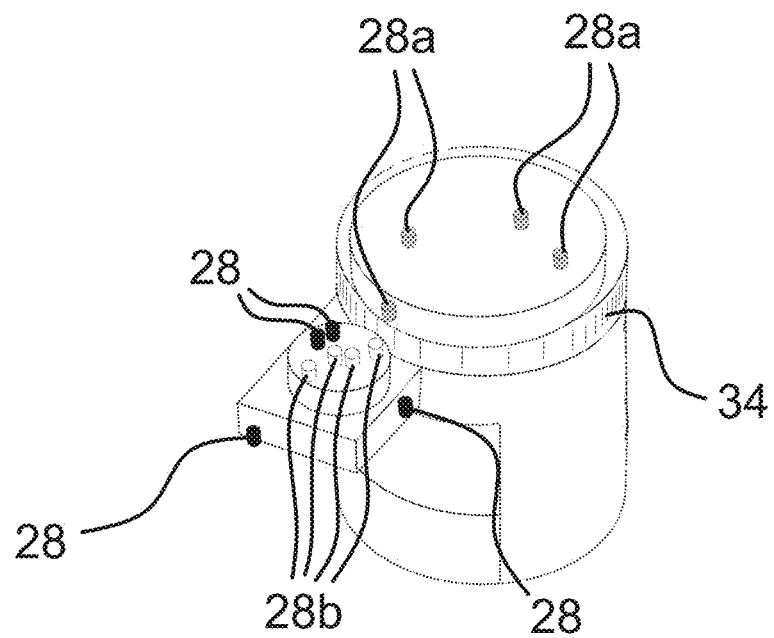
FIG. 12 shows a schematic depiction of the input means.
Figure 13:
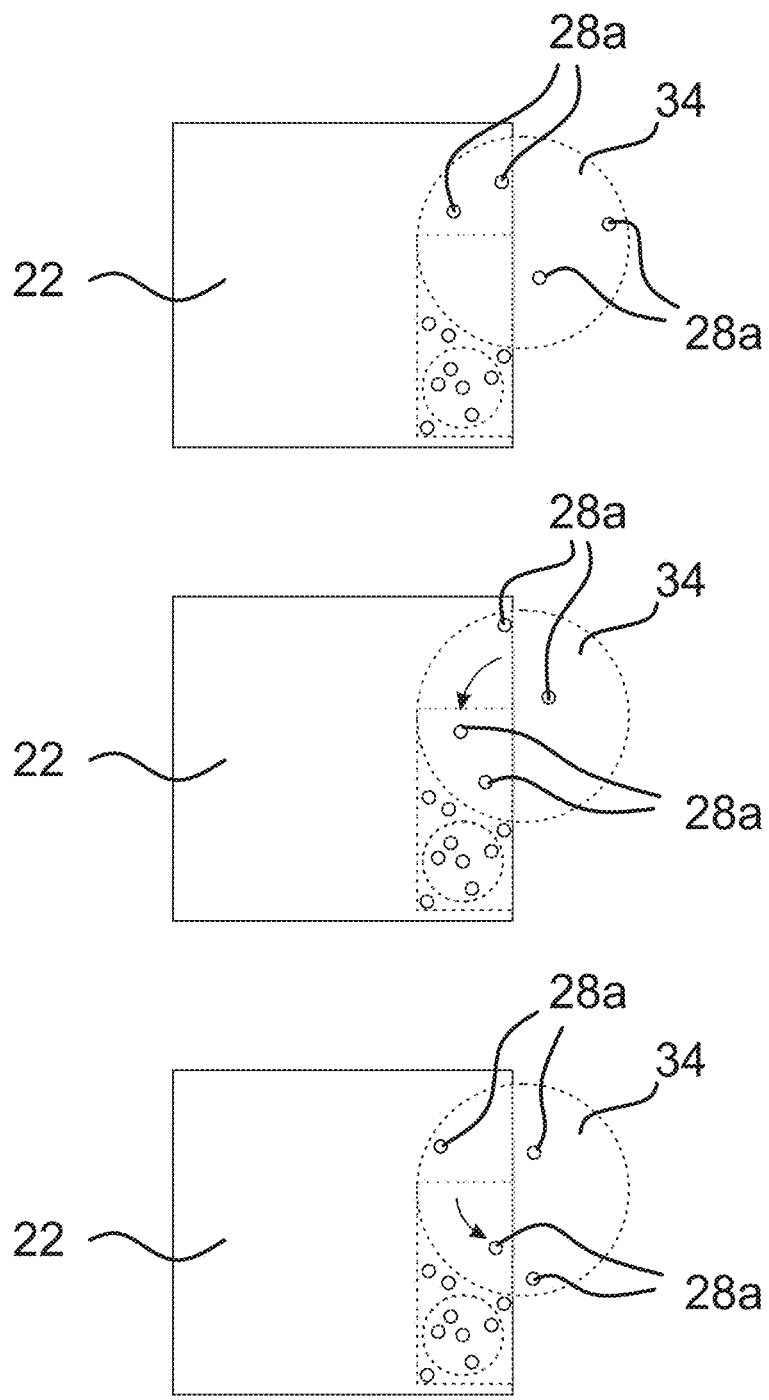
FIG. 13 shows schematic depictions of an operating means configured as a rotary disk in three different rotary positions.
Figure 14:
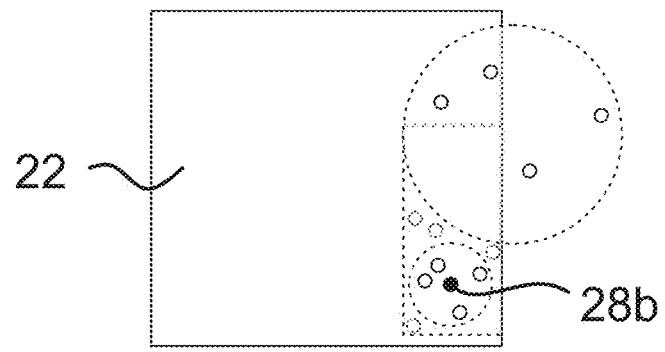
FIG. 14 shows schematic depictions of an input means configured as a three-level consent key in its three different input means positions.
Figure 14:
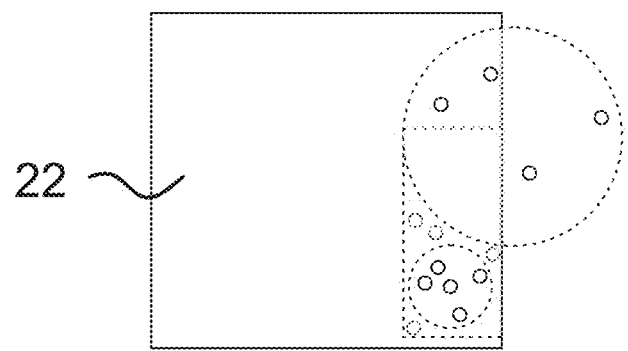
Figure 14:
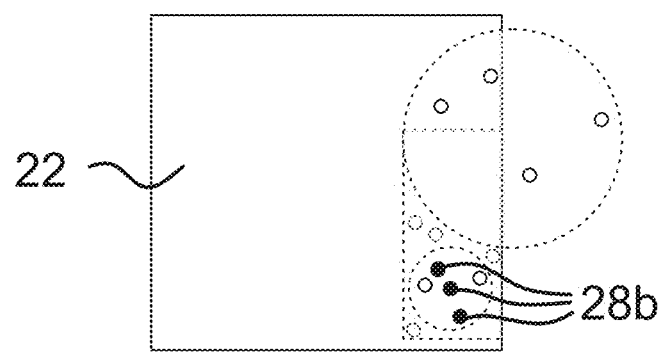

As depicted in particular in FIG. 12 to FIG. 14, the mobile safety basic control apparatus 15 can have further contact pins 28a, 28b that are in physical contact with the multi-touchscreen 22 and are configured to form a pattern that takes its position and/or angular position on the multi-touchscreen 22 as a basis for transmitting a piece of information associated with the respective position and/or angular position to the terminal controller 21, as illustrated in particular in FIG. 13 and FIG. 14.

As shown in FIG. 13, for example, the further contact pins 28a may be arranged on a rotary disk 34, mounted in a manually rotatable manner in the housing 16 of the mobile safety basic control apparatus 15, that only partially overlaps the multi-touchscreen 22, such that the angular position of the rotary disk 34, as schematically illustrated in the depictions of FIG. 13, is the basis for a different subset of the further contact pins 28a being in physical contact with the multi-touchscreen 22 and the respective complementary set of contact pins 28a being outside the multi-touchscreen 22.

Figure 15:
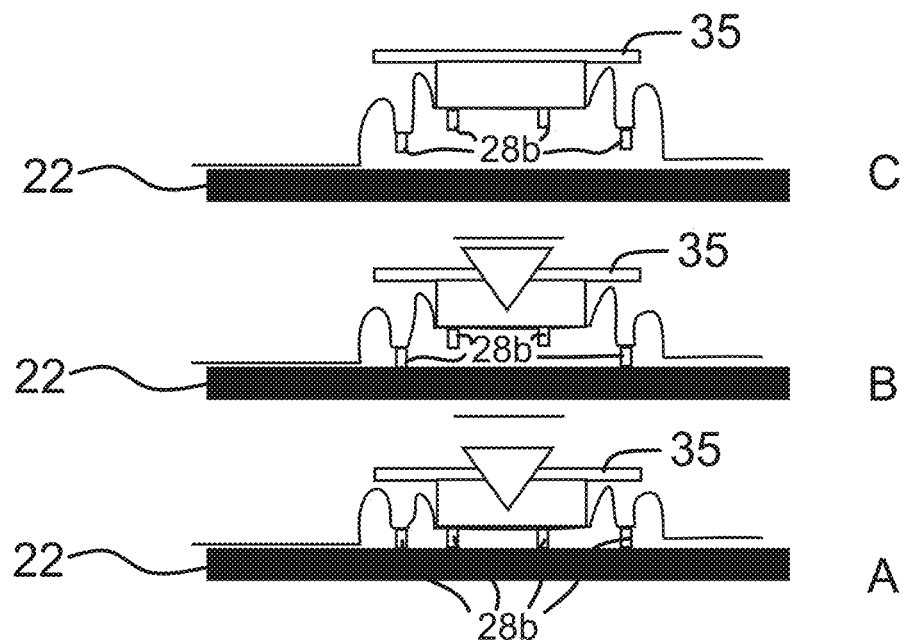
FIG. 15 shows schematic side depictions of the input means configured as a three-level consent key as shown in FIG. 14 in its three possible input means positions.
Figure 16:
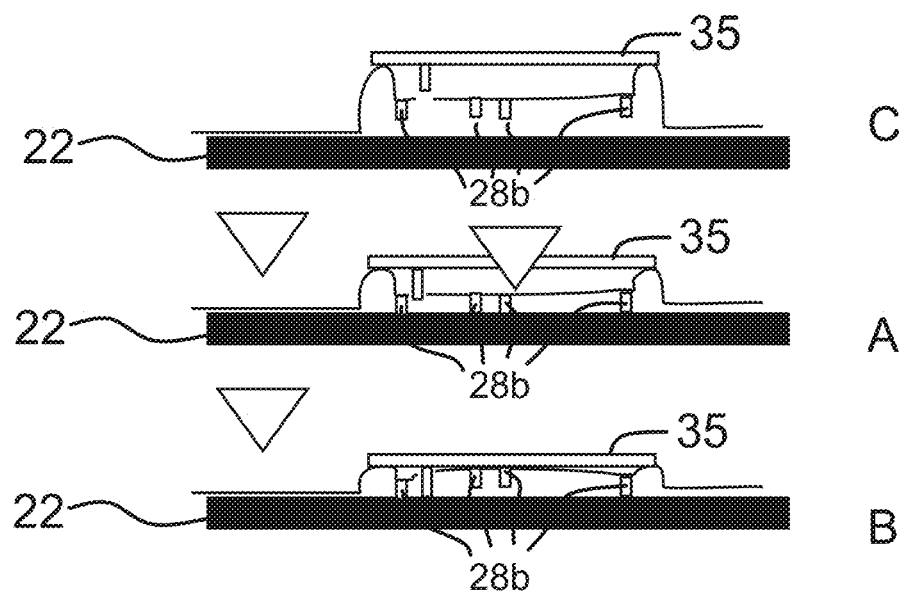
FIG. 16 shows schematic side depictions of a modified embodiment of the input means configured as a three-level consent key as shown in FIG. 14 in its three possible input means positions.

In a variant embodiment as shown in FIG. 14 to FIG. 16, the safety basic control apparatus 15 can have a manual input means 35 configured so as, in a first input means position A, to bring the further contact pins 28b into physical contact with the multi-touchscreen 22 and, in a second input means position C, to break the physical contact between the further contact pins 28b and the multi-touchscreen 22.

The safety basic control apparatus 15 can accordingly have a manual input means 35 having three successive input means positions, wherein in the second input means position (C) a first group of further contact pins 28b and a second group of further contact pins 28b have had a physical contact with the multi-touchscreen 22 broken, in the third input means position B the first group of further contact pins 28b is in physical contact with the multi-touchscreen 22 and the second group of further contact pins 28b has had a physical contact with the multi-touchscreen 22 broken, and in the first input means position A the first group of further contact pins 28b and the second group of further contact pins 28b are in physical contact with the multi-touchscreen 22.

Additionally, the mobile safety basic control apparatus 15, as depicted in particular in FIG. 2, can have a luminous ring 36 constructed from multiple individually actuatable luminous segments 37, and the mobile safety basic control apparatus 15 may in this case be set up to take a switching state transmitted to the terminal controller 21 via the multi-touchscreen 22 by the two or more contact pins 28 and/or the further contact pins 28a, 28b as a basis for actuating the individual luminous segments 37 of the luminous ring 36 in a specific manner.

What is claimed is:

1. A method for operating a robot using a mobile terminal, the mobile terminal having a multi-touchscreen, the method comprising:
   mounting a mobile safety basic control apparatus on the mobile terminal;
   the mobile safety basic control apparatus transmitting via the multi-touchscreen at least one identification code identifying the mobile safety basic control apparatus; and
   via an emergency stop switch on the mobile safety basic control apparatus, stopping the robot.

2. The method of claim 1 wherein:
   the mounting comprises receiving by a guide groove of the mobile safety basic control apparatus an edge section of the mobile terminal.

3. The method of claim 2 wherein:
   the groove has a first groove wall and a second groove wall, opposite the first groove wall with the safety basic control apparatus mounted on the mobile terminal, the second groove wall abuts a rear of the mobile terminal, opposite the multi-touchscreen.

4. The method of claim 1 wherein:
   the transmitting comprises contacting by two or more contact pins the multi-touchscreen in a specific two-dimensional arrangement representing an identification code of the two or more contact pins.

5. The method of claim 1 further comprising:
   moving the mobile safety basic control apparatus along the edge section of the mobile terminal as a slide control.

6. The method of claim 1 further comprising:
   providing manual input by moving contact pins along the multi-touchscreen.

7. The method of claim 1 further comprising:
   providing manual input by bringing contact pins into physical contact with the multi-touchscreen and breaking the physical contact between the contact pins and the multi-touchscreen.

8. The method of claim 1 further comprising:
   providing manual input by rotating a rotary disk having contact pins, the rotary disk mounted in a manually rotatable manner in the housing, that only partially overlaps the multi-touchscreen, such that the angular position of the rotary disk is the basis for a different subset of the further contact pins being in physical contact with the multi-touchscreen and the respective complementary set of the further contact pins being outside the multi-touchscreen.

9. The method of claim 1 wherein:
   the mobile safety basic control apparatus has a luminous ring constructed from multiple individually actuatable luminous segments; and
   the mobile safety basic control apparatus takes a switching state transmitted to a terminal controller of the mobile terminal via the multi-touchscreen by contact pins as a basis for actuating the individual luminous segments of the luminous ring in a specific manner.

10. A method for operating a robot using a mobile terminal, the mobile terminal having a multi-touchscreen, the method comprising:
    mounting a mobile safety basic control apparatus on the mobile terminal;
    via the multi-touchscreen the mobile safety basic control apparatus transmitting at least one identification code identifying the mobile safety basic control apparatus; and
    providing manual input by moving contact pins along the multi-touchscreen.

11. The method of claim 10 wherein:
    the mounting comprises receiving by a guide groove of the mobile safety basic control apparatus an edge section of the mobile terminal.

12. The method of claim 10 wherein:
    the providing manual input by moving contact pins along the multi-touchscreen comprises moving the mobile safety basic control apparatus along the edge section of the mobile terminal as a slide control.

13. A method for setting up an explicitly assigned control connection between a mobile safety basic control apparatus and a mobile terminal having a multi-touchscreen for controlling a robot, the method comprising:

transmitting an identification code from the mobile safety basic control apparatus to the mobile terminal by virtue of the identification code being automatically input and transmitted by the mobile safety basic control apparatus as a multitouch input on the multi-touchscreen of the mobile terminal by virtue of the safety basic control apparatus being put onto the mobile terminal;

identifying the mobile safety basic control apparatus by means of a terminal controller of the mobile terminal on a basis of the transmitted identification code; and enabling function control input means of the mobile terminal by means of the terminal controller in order to actuate functions of a robot associated with the mobile safety basic control apparatus.

14. The method as claimed in claim 13, further comprising:

transmitting the identification code in the form of a specific two-dimensional arrangement of multiple touch contact points on the multi-touchscreen of the mobile terminal.

15. The method as claimed in claim 14, wherein:

the identification code in the form of a specific two-dimensional arrangement of multiple touch contact points on the multi-touchscreen of the mobile terminal, is characterized by a total number of said touch contact points, by the relative orientations of said multiple touch contact points in relation to one another and/or by the orientation of a group of said multiple touch contact points in contact with the multi-touchscreen of the mobile terminal.

\* \* \* \* \*